US009584957B2

(12) United States Patent
Huntington et al.

(10) Patent No.: US 9,584,957 B2
(45) Date of Patent: Feb. 28, 2017

(54) TRACKING WIRELESS TRANSMITTERS IN PROCESS LOCATIONS

(71) Applicants: Richard A. Huntington, Houston, TX (US); Bin Xu, The Woodlands, TX (US); Wayne S. Pon, Calgary (CA); Vasudev Rayachoti, The Woodlands, TX (US)

(72) Inventors: Richard A. Huntington, Houston, TX (US); Bin Xu, The Woodlands, TX (US); Wayne S. Pon, Calgary (CA); Vasudev Rayachoti, The Woodlands, TX (US)

(73) Assignee: ExxonMobile Upstream Research Company, Spring, TX (US)

( * ) Notice: Subject to any disclaimer, the term of this patent is extended or adjusted under 35 U.S.C. 154(b) by 10 days.

(21) Appl. No.: 14/715,292

(22) Filed: May 18, 2015

(65) Prior Publication Data

US 2015/0350817 A1 Dec. 3, 2015

Related U.S. Application Data

(60) Provisional application No. 62/004,635, filed on May 29, 2014.

(51) Int. Cl.

| | |
|---|---|
| ***H04W 4/00*** | (2009.01) |
| ***H04W 4/04*** | (2009.01) |
| ***G01S 19/01*** | (2010.01) |
| ***G01S 5/02*** | (2010.01) |

(52) U.S. Cl.

CPC ............... *H04W 4/008* (2013.01); *G01S 5/02* (2013.01); *G01S 19/01* (2013.01); *H04W 4/04* (2013.01)

(58) Field of Classification Search

USPC ... 455/456.1, 457, 67.11, 41.1, 432.2, 456.2, 455/456.3, 428, 436, 70, 73

See application file for complete search history.

(56) References Cited

U.S. PATENT DOCUMENTS

| | | | | |
|---|---|---|---|---|
| 7,605,696 | B2 | 10/2009 | Quatro | 340/539.13 |
| 7,688,198 | B2 | 3/2010 | Amidi | 340/539 |
| 7,882,438 | B2 | 2/2011 | Markham et al. | 715/736 |
| 8,140,658 | B1 | 3/2012 | Gelvin et al. | 709/224 |
| 8,332,063 | B2 | 12/2012 | Moshier | 700/108 |
| 8,510,141 | B2 | 8/2013 | Nielsen et al. | 705/7.11 |
| 2003/0197612 | A1* | 10/2003 | Tanaka | G06K 17/00 340/572.1 |
| 2004/0077367 | A1* | 4/2004 | Sama | H04H 20/61 455/518 |

(Continued)

*Primary Examiner* — Ganiyu A Hanidu

(74) *Attorney, Agent, or Firm* — ExxonMobil Upstream Research Company Law Department

(57) ABSTRACT

A system for wirelessly monitoring a property in a process, comprising a sensor data device for providing sensor data relating to the process a memory device comprising information, wherein the information comprises transmission information, a transportable wireless transmission device configured to receive the sensor data and the information, interpret the transmission information, and transmit the sensor data, the information, or both to a receiving station using the transmission information, and a temporary mounting position in proximity to the memory device for temporarily positioning the transportable wireless transmission device.

19 Claims, 3 Drawing Sheets

100
102
Sensor Data Device
106
Wireless Transmission Device
RFID
104
GPS
108

(56) References Cited

U.S. PATENT DOCUMENTS

| | | | | |
|---|---|---|---|---|
| 2004/0174264 | A1* | 9/2004 | Reisman | G07C 1/10 340/573.4 |
| 2005/0289276 | A1* | 12/2005 | Karschnia | G05B 19/4185 710/305 |
| 2006/0192671 | A1* | 8/2006 | Isenmann | G05B 19/042 340/531 |
| 2007/0243830 | A1* | 10/2007 | Isenmann | H04L 12/4625 455/67.11 |
| 2013/0170378 | A1 | 7/2013 | Ray et al. | 370/252 |

* cited by examiner

TRACKING WIRELESS TRANSMITTERS IN PROCESS LOCATIONS

CROSS REFERENCE TO RELATED APPLICATIONS

This application claims the priority benefit of U.S. patent application No. 62/004,635 filed May 29, 2014 entitled TRACKING WIRELESS TRANSMITTERS IN PROCESS LOCATIONS, the entirety of which is incorporated by reference herein.

BACKGROUND

Various instruments, sensors, and other components are used in industrial settings such as in processes within hydrocarbon production and processing plants. Typically, there are a large number such components that require monitoring, for example, for control, for safety, for health monitoring, for system operation, for calibration, for error detection, for troubleshooting, or for a variety of other purposes.

Currently, wired data transmission devices are the primary devices for transmitting sensor data to a central repository in an industrial setting. However, wired data transmission includes several costs, for example, cabling, junction boxes, trenches, etc. One advantage of wireless technologies is that wiring is not required, reducing costs related to cabling, junction boxes, trenches, input/output (I/O) connections, etc. and reducing the commissioning time. Consequently, when there is a need to monitor a specific Process Variable (PV) at a location without an existing instrument, a wireless instrument may be utilized. While wireless transmission devices for sending sensor data are known in the art, such devices are either not transportable or, if transportable, are susceptible to misplacement, loss, incorrect device monitoring, and to confusion with other wireless transmission devices. This persistent problem in the industry may hamper system monitoring, system diagnostics, and system troubleshooting.

SUMMARY

One embodiment includes a system for wirelessly monitoring a property in a process, comprising a sensor data device configured to provide sensor data relating to the process, a memory device comprising information, wherein the information comprises transmission information, and a transportable wireless transmission device configured to receive the sensor data and the information, interpret the transmission information, and transmit the sensor data, the information, or both to a receiving station using the transmission information.

Another embodiment includes a method for wirelessly tracking a component, comprising mapping a layout of a plant, populating a component identification device with component-specific data for a component, wherein the component identification device is proximally positioned with respect to the component, proximally positioning a component location device in a position with respect to the component, obtaining a location of the component, transmitting the location of the component, the component-specific data, or both to a receiving station, and determining the location of the component with respect to the layout of the plant.

Still another embodiment includes an apparatus for transmitting a location of a component, comprising a first receiver for receiving a component-specific data from a component identification device, a second receiver for receiving the location of the component from a component location device, a transmitter for transmitting the location of the component to a receiving station, a memory for storing the component-specific data and the location of the component, and a processor coupled to the memory, the transmitter, the first receiver, and the second receiver, wherein the memory comprises instructions that when executed by the processor cause the apparatus to receive the component-specific data from the component identification device, receive the data of the component from the component location device, and transmit the location of the component to the receiving station.

BRIEF DESCRIPTION OF THE DRAWINGS

The advantages of the present techniques are better understood by referring to the following detailed description and the attached drawings, in which.

DETAILED DESCRIPTION

Figure 1:
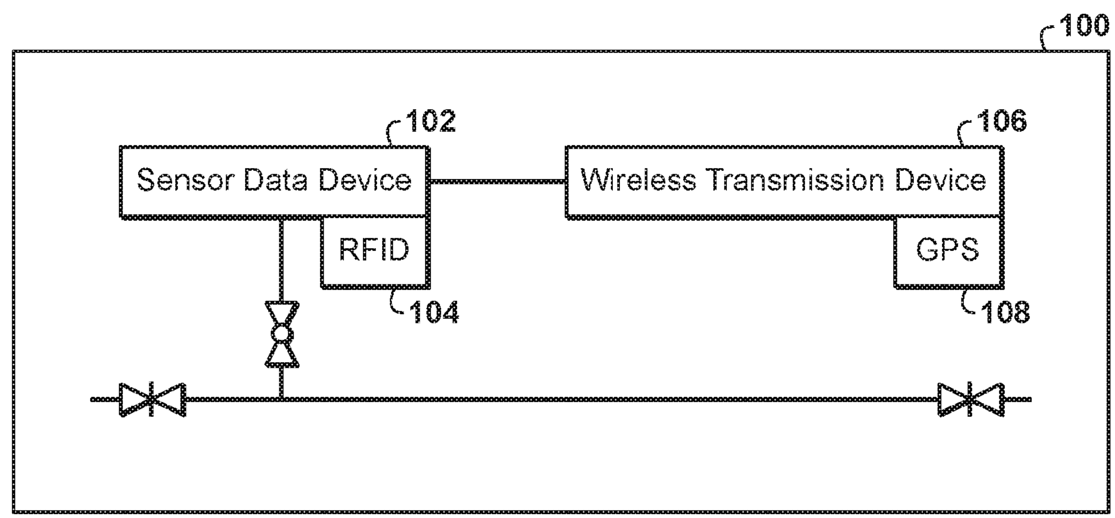
FIG. 1 is a schematic diagram of a plant for use with a first embodiment.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described herein, but rather, include all alternatives, modifications, and equivalents falling within the true spirit and scope of the appended claims.

This disclosure comprises techniques to track the location of a transportable wireless transmission device relative to a process. It is envisioned that the transportable wireless transmission device be temporarily installable at a variety of locations. Once placed in a new location, the transportable wireless transmission device may read an RFID installed at a local and/or proximate sensor to obtain information about the sensor and/or about how to transmit information to a receiving station. The transportable wireless transmission device may include a mechanism for obtaining the physical location of the transportable wireless transmission device and/or the sensor, e.g., global positioning system (GPS), location information on the RFID, etc. The transportable wireless transmission device may then send this location to the receiving station for logging the location of the transportable wireless transmission device and/or the sensor with respect to the process. Knowing sensor locations in the process may offer a number of advantages, including enabling localization of the sensors for maintenance purpose, e.g. replace battery, recalibrating the sensor, etc., and enabling efficient operation and troubleshooting of the system. It will be understood that these and other features could be combined into an integral component, e.g., a "smart" (advanced computer communications capable) sensor, within the scope of this disclosure. While appropriate in some circumstances, such a solution may not be appropriate in others. For example, the costs associated with updating all of the sensors in a plant may be prohibitive. The proposed solution permits a temporary or permanent upgradability for existing "dumb" (advanced computer communications incapable) sensors or other components without the costs associated with full replacement.

At the outset, for ease of reference, certain terms used in this application and their meanings as used in this context are set forth. To the extent a term used herein is not defined herein, it should be given the broadest definition persons in the pertinent art have given that term as reflected in at least one printed publication or issued patent. Further, the present techniques are not limited by the usage of the terms shown herein, as all equivalents, synonyms, new developments, and terms or techniques that serve the same or a similar purpose are considered to be within the scope of the present claims.

As used herein, the term "computer component" refers to a computer-related entity, namely, hardware, firmware, software, a combination thereof, or software in execution. For example, a computer component can be, but is not limited to being, a process running on a processor, a processor, an object, an executable, a thread of execution, a program, and a computer. One or more computer components can reside within a process and/or thread of execution and a computer component can be localized on one computer and/or distributed between two or more computers.

As used herein, the terms "computer-readable medium," "non-transitory, computer-readable medium" or the like refer to any tangible storage that participates in providing instructions to a processor for execution. Such a medium may take many forms, including but not limited to, non-volatile media, and volatile media. Non-volatile media includes, for example, Non-Volatile Random Access Memory (NVRAM), or magnetic or optical disks. Volatile media includes dynamic memory, such as main memory. Computer-readable media may include, for example, a floppy disk, a flexible disk, hard disk, magnetic tape, or any other magnetic medium, magneto-optical medium, a Compact Disk Read Only Memory (CD-ROM), any other optical medium, a Random Access Memory (RAM), a synchronous RAM (SRAM), a dynamic random-access memory (DRAM), a synchronous dynamic RAM (SDRAM), a Programmable ROM (PROM), and Electrically Programmable ROM (EPROM), Electrically Erasable and Programmable ROM (EEPROM), a FLASH-EPROM, a solid state medium like a holographic memory, a memory card, or any other memory chip or cartridge, or any other physical medium from which a computer can read. When the computer-readable media is configured as a database, it is to be understood that the database may be any type of database, such as relational, hierarchical, object-oriented, and/or the like. Accordingly, exemplary embodiments of the present techniques may be considered to include a tangible, non-transitory storage medium or tangible distribution medium and prior art-recognized equivalents and successor media, in which the software implementations embodying the present techniques are stored.

"Computer communication," as used herein, refers to a communication between two or more computing devices (e.g., computer, personal digital assistant, cellular telephone) and can be, for example, a network transfer, a file transfer, an applet transfer, an email, a hypertext transfer protocol (HTTP) transfer, and so on. A computer communication can occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, and so on. Wireless computer communications may utilize one or more of a plurality of communication protocols. Suitable wireless sensor network communications standards include WirelessHART, ISA100.11a, and other open or proprietary wireless protocols.

"Data store," as used herein, refers to a physical and/or logical entity that can store data. A data store may be, for example, a database, a table, a file, a list, a queue, a heap, a memory, a register, and so on. A data store may reside in one logical and/or physical entity and/or may be distributed between two or more logical and/or physical entities.

"Logic," as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logical logics are described, it may be possible to incorporate the multiple logical logics into one physical logic. Similarly, where a single logical logic is described, it may be possible to distribute that single logical logic between multiple physical logics.

An "operable connection," or a connection by which entities are "operably connected," is one in which signals, physical communications, and/or logical communications may be sent and/or received. Typically, an operable connection includes a physical interface, an electrical interface, and/or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical and/or physical communication channels can be used to create an operable connection.

"Signal," as used herein, includes but is not limited to one or more electrical or optical signals, analog or digital signals, data, one or more computer or processor instructions, messages, a bit or bit stream, or other means that can be received, transmitted and/or detected.

"Software," as used herein, includes but is not limited to, one or more computer or processor instructions that can be read, interpreted, compiled, and/or executed and that cause a computer, processor, or other electronic device to perform functions, actions and/or behave in a desired manner. The instructions may be embodied in various forms like routines, algorithms, modules, methods, threads, and/or programs including separate applications or code from dynamically linked libraries. Software may also be implemented in a variety of executable and/or loadable forms including, but not limited to, a stand-alone program, a function call (local and/or remote), a servelet, an applet, instructions stored in a memory, part of an operating system or other types of executable instructions. It will be appreciated by one of ordinary skill in the art that the form of software may be dependent on, for example, requirements of a desired application, the environment in which it runs, and/or the desires of a designer/programmer or the like. It will also be appreciated that computer-readable and/or executable instructions can be located in one logic and/or distributed between two or more communicating, co-operating, and/or parallel processing logics and thus can be loaded and/or executed in serial, parallel, massively parallel and other manners.

"Transportable," as used herein, means capable of carrying, moving or conveying from one place, location, or position to another.

"User," as used herein, includes but is not limited to one or more persons, software, computers or other devices, or combinations of these.

A "process" as used herein with respect to computer components is generally conceived to be a sequence of processor or computer-executable steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is convention for those skilled in the art to refer to these signals as bits, values, elements, symbols, characters, terms, objects, numbers, records, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc., which are often associated with manual operations performed by a human operator. It is understood that no such involvement of a human operator is necessary or even desirable in the present invention. The operations described herein are machine operations performed in conjunction with human operators) or operators (or users) who interact with the computer(s). The machines used for performing the operation of the present invention include general digital computers or other similar processing devices.

In addition, it should be understood that the programs, processes, methods, etc., described herein are not related or limited to any particular computer or apparatus. Rather, various types of general purpose machines may be used with programs constructed in accordance with the teachings described herein. Similarly, it may prove advantageous to construct specialized apparatus to perform at least a portion of the techniques described herein by way of dedicated computer systems with hard-wired logic or programs stored in nonvolatile memory, such as read only memory.

While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. While the figures illustrate various serially occurring actions, it is to be appreciated that various actions could occur concurrently, substantially in parallel, and/or at substantially different points in time.

FIG. 1 is a schematic diagram of a plant 100 for use with a first embodiment. The system 100, e.g., an oil refinery, comprises a component or sensor data device 102 for monitoring a system parameter of the system 100, e.g., temperature, pressure, valve position, device position, flow, composition, conductivity, resistivity, differential pressure, mass spectrometry, humidity, density, level, angle, light, amps, voltage, weight, magnetic field, or the like. The sensor data device 102 may be permanently or temporarily installed in its location with respect to the system 100, e.g., on a steam header, at a pump inlet, on a recirculation line, on pressure vessel, a feed leg, or any other components of a plant as understood by those of skill in the art. The sensor data device 102 is coupled to a component identification device or memory device 104, e.g., a radio-frequency identification (RFID) tag, although alternate embodiments may alternately locate the memory device 104 in proximity to the sensor data device 102, e.g., by permanently or temporarily affixing the memory device 104 to an inlet pipe, integrally to a valve body, etc. The memory device 104 may comprise information related to the sensor including a tag number, a sensor component identification number, an instrument range of the component, a calibration date of the component, and an installation date of the component. The memory device 104 may further comprise information related to wireless transmissions to a receiving station, e.g., a communications protocol, gateway router identification, etc. A transportable wireless transmission device 106 may be operatively coupled to the sensor data device 102. Installation of the transportable wireless transmission device 106 may include proximally positioning the transportable wireless transmission device 106 with respect to the sensor data device 102 and fixing the transportable wireless transmission device 106 to a generic or specifically designated structure or mounting location, e.g., using screws, bolts, brackets, hook-and-loop fasteners, or other such items as known in the art. The transportable wireless transmission device 106 may be operatively coupled to an internal or external power source and may be configured to receive the sensor data, e.g., via wired communications, receive information from the memory device, e.g., using an integral RFID reader or receiver, and transmit data, e.g., sensor data, to a receiving station (not pictured) using a transmitter or transceiver. The transportable wireless transmission device 106 may be operatively coupled to a global positioning system (GPS) receiver 108.

Figure 2A:
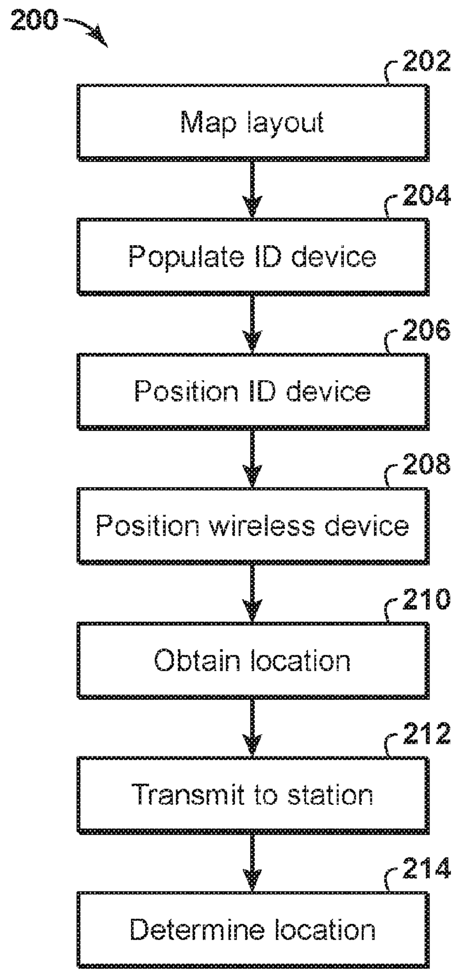
FIG. 2A is a flowchart showing a process for wirelessly monitoring and/or tracking the location of a component using a wireless transmission device.

FIG. 2A is a flowchart showing a process 200 for wirelessly monitoring and/or tracking the location of a component, e.g., sensor data device 102 of FIG. 1, using a wireless transmission device, e.g., transportable wireless transmission device 106 of FIG. 1. Process 200 begins at block 202 with mapping a layout of a plant. For example, mapping the layout of a plant may comprise using electronic tools known in the art to create a layout, a map, and/or a data store repository comprising a logical representation of the spatial characteristics of an industrial plant in two or three dimensions. Using these tools, various components, e.g., sensors, pipes, tanks, valves, heat exchangers, steam generators, turbines, etc., may be assigned particular locations within the logical layout or map corresponding to real-world locations. At block 204, the process 200 includes populating a component identification device, e.g., the memory device 104 of FIG. 1, with component-specific data for the component. At block 206, the process 200 includes positioning the component identification device proximate to the component. As explained above with respect to the memory device 104 of FIG. 1, in some embodiments the component identification device is proximally positioned with respect to the component using one or more of a variety of permanent or temporary affixing techniques. At block 208, the process 200 includes positioning the wireless transmission device proximate to the component. As explained above with respect to the temporary wireless transmission device 106 of FIG. 1, in some embodiments the component identification device is proximally positioned with respect to the component using one or more of a variety of temporary affixing techniques. At block 210, the process 200 includes obtaining a location of the component. This step may be carried out by the wireless transmission device and may be accomplished using a variety of techniques, for example, by using an operatively coupled internal or external GPS, e.g., GPS receiver 108 of FIG. 1, by receiving location information from the client identification device, by recording movement from a known location using internal tracking mechanisms, e.g., piezoelectric crystal configurations and/or gyroscopes capturing and recording three dimensional movement, by using wireless signals to triangulate location, etc. At block 212, the process 200 includes transmitting the location of the component, the component-specific data, or both to a receiving station. The receiving station may be a central data store repository, a computer component gateway, e.g., a router, or other device capable of receiving a wireless transmission from the wireless transmission device. In some embodiments, the receiving station will be a singular receiving station for the whole plant. In other embodiments, a plurality of receiving stations will receive wireless transmissions from a plurality of wireless transmission devices. Such embodiments may share this information between receiving stations or may pass the information to a data store coordination device configured to supervise the operation of the receiving stations. In still other embodiments, a receiving station may be configured to monitor a plurality of plants, e.g., by receiving sensor data from a plurality of sensor data devices located in different plants. Other such combinations, permutations, and alternative architectures will be apparent to those of skill in the art. At block 214, the process 200 includes determining the location of the component or the wireless transmission device with respect to the layout of the plant. This step may occur on any suitable computing device, e.g., at the receiving station. Other embodiments may perform the step of block 214 at the wireless transmission device, e.g., prior to transmission, or at a gateway node. Once the location of the component or the wireless transmission device is known, this information may be stored or recorded in a data store. Further uses for this information, e.g., in graphic displays of the system, in calibration checks, in troubleshooting, etc., will be readily apparent to those of skill in the art.

Figure 2B:
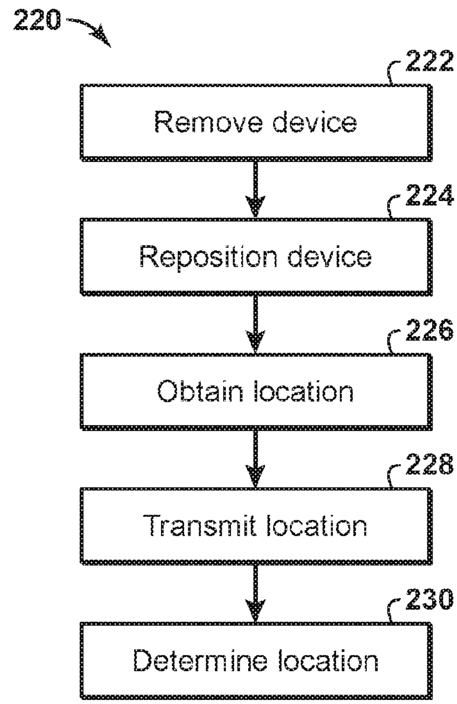
FIG. 2B is a flowchart showing a process for wirelessly monitoring and/or tracking the location of a component using a wireless transmission device following movement of the wireless transmission device.

FIG. 2B is a flowchart showing a process 220 for wirelessly monitoring and/or tracking the location of a component, e.g., sensor data device 102 of FIG. 1, using a wireless transmission device, e.g., transportable wireless transmission device 106 of FIG. 1. The process 220 is a continuation of the process 200 for certain embodiments of this disclosure. The components of process 220 are the same as the corresponding components of process 200 except as otherwise noted. At block 222, the process 220 includes removing wireless transmission device from the position. At block 224, the process 220 includes positioning the wireless transmission device in a second position proximate to a second component, e.g., a sensor data device 102 of FIG. 1, wherein the second position is positioned proximate to a second component identification device, e.g., a memory device 104 of FIG. 1, having component-specific data for the second component. At block 226, the process 220 includes obtaining a location of the second component, e.g., as described for block 210 of FIG. 2A. At block 228, the process 220 includes transmitting the location of the second component, the component-specific data, the transportable wireless transmission device, or a combination thereof to a receiving station, e.g., as described for block 212 of FIG. 2A. At block 230, the process 220 includes determining the location of the second component with respect to the layout of the plant, e.g., as described for block 214 of FIG. 2A. Once the location of the component or the wireless transmission device is known, this information may be stored or recorded in a data store.

Figure 2C:
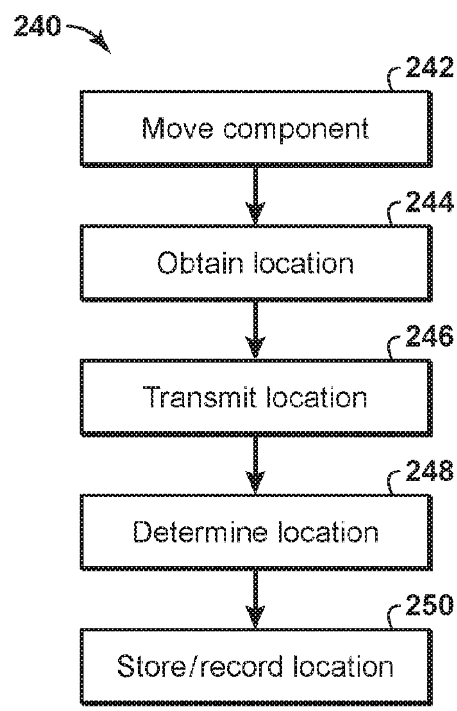
FIG. 2C is a flowchart showing a process for wirelessly monitoring and/or tracking the location of a component using a wireless transmission device following movement of the component.

FIG. 2C is a flowchart showing a process 240 for wirelessly monitoring and/or tracking the location of a component, e.g., sensor data device 102 of FIG. 1, using a wireless transmission device, e.g., transportable wireless transmission device 106 of FIG. 1. The process 240 may be a continuation of the process 200 or the process 220 for various embodiments of this disclosure. Consequently, the components of process 240 are the same as the corresponding components of process 200 except as otherwise noted. At block 242, the process 240 may include moving the component to a second position, e.g., a second location within the plant 100. As will be understood, various embodiments include moving the memory device, e.g., the memory device 104 of FIG. 1, in conjunction with moving the component. At block 244, the process 240 may include obtaining a second location of the component, e.g., using a first or second wireless transmission device, e.g., the wireless transmission device 106 of FIG. 1. At block 246, the process 240 may include transmitting the second location of the component, the component-specific data, the wireless transmission device, or a combination thereof to a receiving station. At block 248, the process 240 may include determining the second location of the component or the wireless transmission device with respect to the layout of the plant. Once the location of the component or the wireless transmission device is known, at block 250 this information may be stored or recorded in a data store.

Figure 3:
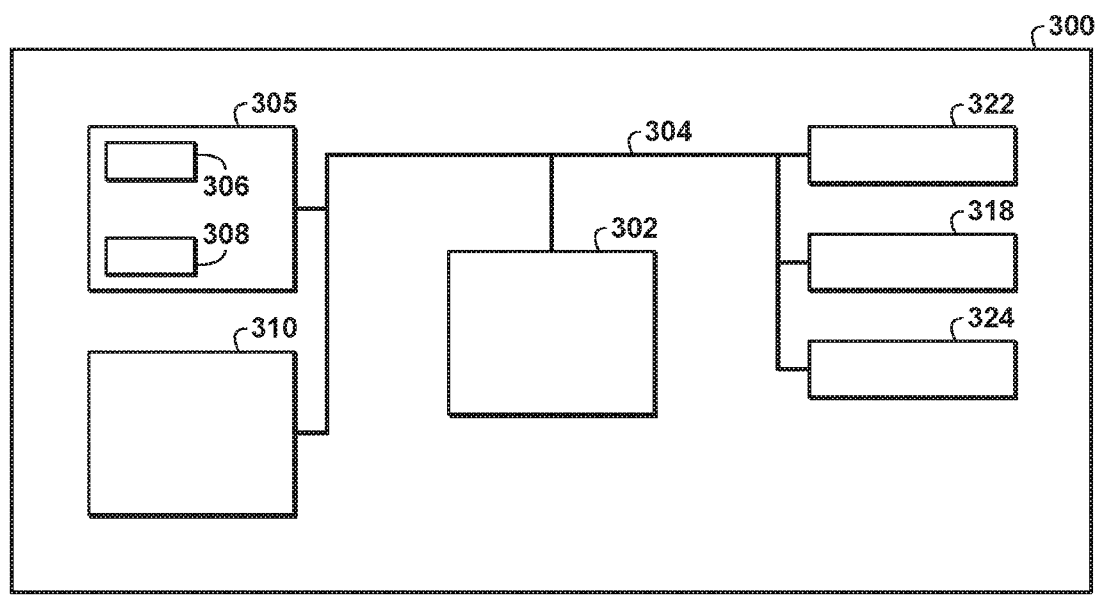
FIG. 3 is a block diagram of a general purpose computer system.

FIG. 3 is a block diagram of a general purpose computer system 300 suitable for implementing one or more embodiments of the components described herein. The computer system 300 comprises a central processing unit (CPU) 302 coupled to a system bus 304. The CPU 302 may be any general-purpose CPU or other types of architectures of CPU 302 (or other components of exemplary system 300), as long as CPU 302 (and other components of system 300) supports the operations as described herein. Those of ordinary skill in the art will appreciate that, while only a single CPU 302 is shown in FIG. 3, additional CPUs may be present. Moreover, the computer system 300 may comprise a networked, multi-processor computer system that may include a hybrid parallel CPU/Graphics Processing Unit (GPU) system (not depicted). The CPU 302 may execute the various logical instructions according to various embodiments. For example, the CPU 302 may execute machine-level instructions for performing processing according to the operational flow described above in conjunction with FIGS. 2A-2C.

The computer system 300 may also include computer components such as non-transitory, computer-readable media or memory 305. The memory 305 may include a RAM 306, which may be SRAM, DRAM, SDRAM, or the like. The memory 305 may also include additional non-transitory, computer-readable media such as a Read-Only Memory (ROM) 308, which may be PROM, EPROM, EEPROM, or the like. RAM 306 and ROM 308 may hold user data, system data, data store(s), process(es), and/or software, as known in the art. The computer system 300 may also include an input/output (I/O) adapter 310, a communications adapter 322, a user interface adapter 324, and a display adapter 318.

The I/O adapter 310 may connect one or more additional non-transitory, computer-readable media such as an internal or external storage device(s) (not depicted), including, for example, a hard drive, a compact disc (CD) drive, a digital video disk (DVD) drive, a floppy disk drive, a tape drive, and the like to computer system 300. The storage device(s) may be used when the memory 305 is insufficient or otherwise unsuitable for the memory requirements associated with storing data for operations of embodiments of the present techniques. Further, user interface adapter 324 may couple to one or more user input devices (not depicted), such as a keyboard, a pointing device and/or output devices, etc. to the computer system 300. The CPU 302 may drive the display adapter 318 to control the display on a display device (not depicted), e.g., a computer monitor or handheld display, to, for example, present information to the user regarding location.

The computer system 300 further includes communications adapter 322. The communications adapter 322 may comprise one or more separate components suitably configured for computer communications, e.g., one or more transmitters, receivers, transceivers, or other devices for sending and/or receiving signals. The computer communications adapter 322 may be configured with suitable hardware and/or logic to send data, receive data, or otherwise communicate over a wired interface or a wireless interface, e.g., carry out conventional wired and/or wireless computer communication, radio communications, near field communications (NFC), optical communications, scan an RFID device, or otherwise transmit and/or receive data using any currently existing or later-developed technology. In some embodiments, the communications adapter 322 is configured to receive and interpret one or more signals indicating location, e.g., a GPS signal, a cellular telephone signal, a wireless fidelity (Wi-Fi) signal, etc.

The architecture of system 300 may be varied as desired. For example, any suitable processor-based device may be used, including without limitation personal computers, laptop computers, computer workstations, and multi-processor servers. Moreover, embodiments may be implemented on application specific integrated circuits (ASICs) or very large scale integrated (VLSI) circuits. Additional alternative computer architectures may be suitably employed, e.g., utilizing one or more operably connected external components to supplement and/or replace an integrated component. In fact, persons of ordinary skill in the art may use any number of suitable structures capable of executing logical operations according to the embodiments. In an embodiment, input data to the computer system 300 may include various plug-ins and library files. Input data may additionally include configuration information.

While the present techniques may be susceptible to various modifications and alternative forms, the exemplary embodiments discussed herein have been shown only by way of example. However, it should again be understood that the techniques disclosed herein are not intended to be limited to the particular embodiments disclosed. Indeed, the present techniques include all alternatives, modifications, combinations, permutations, and equivalents falling within the true spirit and scope of the appended claims.

The invention claimed is:

1. A system for wirelessly monitoring a property in an industrial process, comprising:

a stationary sensor data device configured to provide sensor data relating to the industrial process;

a memory device located proximate to the sensor data device and comprising information, wherein the information comprises transmission information; and a transportable wireless transmission device mounted at a mounting position in proximity to the memory device such that the transportable wireless transmission device is temporarily positioned thereat, the transportable wireless transmission device configured to:

receive the sensor data and the information;

interpret the transmission information; and transmit the location of the stationary sensor data device in the process and one or both of the sensor data and the information to a receiving station using the transmission information.

2. The system of claim 1, wherein the memory device is a radio-frequency identification (RFID) tag.

3. The system of claim 1, wherein the information is related to the sensor, the transportable wireless transmission device, or both, and wherein the information is selected from a group consisting of a tag number, a sensor component identification number, an instrument range of the component, a calibration date of the component, an installation date of the component, a communications protocol, and a gateway router identification.

4. The system of claim 1, wherein the sensor data is selected from a group consisting of temperature, pressure, valve position, flow, composition, conductivity, resistivity, differential pressure, mass spectrometry, humidity, density, level, angle, light, amps, voltage, weight, and magnetic field.

5. The system of claim 1, wherein the wireless transmission device comprises a wireless local area network transmitter, a cellular modem, or both.

6. The system of claim 1, wherein the wireless transmission device comprises a global positioning system (GPS) sensor.

7. The system of claim 1, wherein identifying the location of the component with respect to the process comprises mapping a layout of a plant and identifying the location of the component with respect to the layout of the plant.

8. A method for wirelessly tracking a component, comprising:

mapping a layout of a plant;

populating a component identification device with component-specific data for a component, wherein the component identification device is proximally positioned with respect to the component;

positioning the component identification device proximate to the component;

positioning a wireless transmission device proximate to the component, wherein the wireless transmission device is mounted at a mounting position in proximity to the component such that the wireless transmission device is temporarily positioned thereat;

obtaining a location of the component relative to the wireless transmission device using the component identification device;

transmitting the location of the component, the component-specific data, or both to a receiving station; and determining the location of the component or the wireless transmission device with respect to the layout of the plant.

9. The method of claim 8, further comprising:

removing the wireless transmission device from the position;

positioning the wireless transmission device in a second position proximate to a second component, wherein the second position is proximally positioned with respect to a second component identification device having component-specific data for the second component;

obtaining a location of the second component using the second component identification device;

transmitting the location of the second component, the component-specific data, the wireless transmission device, or a combination thereof to a receiving station; and determining the location of the second component with respect to the layout of the plant.

10. The method of claim 8, further comprising:

moving the component to a second position;

obtaining a second location of the component using the component identification device;

transmitting the second location of the component, the component-specific data, the wireless transmission device, or a combination thereof to a receiving station; and determining the second location of the component or the wireless transmission device with respect to the layout of the plant.

11. The method of claim 8, further comprising displaying the location of the component with respect to the layout of the plant using a graphical user interface (GUI).

12. The method of claim 8, wherein the component location device is a radio-frequency identification (RFID) tag.

13. The method of claim 8, wherein the data is selected from a group consisting of a tag number, a component identification number, a communications protocol, an instrument range of the component, a calibration date of the component, and an installation date of the component.

14. The method of claim 8, wherein the wireless transmission device comprises a wireless local area network transmitter, a cellular modem, or both.

15. The method of claim 8, wherein the wireless transmission device comprises a global positioning system (GPS) sensor.

16. The method of claim 8, wherein proximally positioning the component identification device comprises integrating the component identification device into the body of the component.

17. An apparatus for wirelessly transmitting a location of a component, comprising:

a first receiver for receiving a component-specific data from a component identification device;

a second receiver for receiving the location of the component from a component location device;

a transmitter for transmitting the location of the component to a receiving station;

a memory for storing the component-specific data and the location of the component; and a processor coupled to the memory, the transmitter, the first receiver, and the second receiver, wherein the memory comprises instructions that when executed by the processor cause the apparatus to:

receive the component-specific data from the component identification device;

receive the data of the component from the component location device; and transmit the location of the component to the receiving station; and wherein the apparatus is detachably coupled to a structure, and wherein the component identification device is coupled to the structure.

18. The apparatus of claim 17, wherein the apparatus is detachably electrically coupled to a power source, and wherein the power source is mechanically coupled to the component.

19. The apparatus of claim 17;

wherein the data is selected from a group consisting of a tag number, a component identification number, a communications protocol, an instrument range of the component, a calibration date of the component, an installation date of the component, and a sensor reading, wherein the transmitter comprises a wireless local area network transmitter, a cellular modem, or both, wherein the location is a global positioning system (GPS) location, and wherein the transmitted location of the component comprises information sufficient to indicate the placement of the component with respect to a mapped layout of a plant.

* * * * *